United States Patent [19]

Yamaoka et al.

[11] Patent Number: 4,567,059
[45] Date of Patent: Jan. 28, 1986

[54] ELECTRONCONDUCTIVE PASTE TO BE BAKED ON CERAMIC BODIES TO PROVIDE CAPACITORS, VARISTORS OR THE LIKE

[75] Inventors: Nobutatsu Yamaoka, Harunamachi; Kazuo Sasazawa, Maebashi, both of Japan

[73] Assignee: Taiyo Yuden Co., Ltd., Tokyo, Japan

[21] Appl. No.: 510,725

[22] Filed: Jul. 5, 1983

Related U.S. Application Data

[62] Division of Ser. No. 349,312, Feb. 16, 1982, abandoned.

[30] Foreign Application Priority Data

Feb. 27, 1981 [JP] Japan .................................. 56-27880

[51] Int. Cl.$^4$ ............................................. B05D 5/12
[52] U.S. Cl. ........................................ 427/79; 427/80;
427/100; 427/101; 427/123; 427/126.2;
427/126.3; 427/376.3
[58] Field of Search ................ 427/79, 80, 123, 126.2,
427/126.3, 376.3, 100, 101, 102

[56] References Cited

U.S. PATENT DOCUMENTS

| | | | |
|---|---|---|---|
| 3,784,407 | 1/1974 | Shiio et al. | 427/101 |
| 4,130,854 | 12/1978 | Hertz | 427/79 |
| 4,486,813 | 12/1984 | Maher | 427/79 |

Primary Examiner—Richard Bueker
Attorney, Agent, or Firm—Woodcock Washburn Kurtz Mackiewicz & Norris

[57] ABSTRACT

An electroconductive paste consists essentially of 100 parts by weight of zinc in finely divided form, from about 0.01 to 10.00 parts by weight of a glass frit such as, typically, that of $PbO$-$B_2O_3$-$SiO_2$ composition, and a vehicle such as alpha-terpineol containing ethylcellulose as an organic binder, for pasting the mixture of the zinc powder and the glass frit. The paste may contain an additive or additives such as the oxides of some metallic elements. By being baked on ceramic bodies at a temperature above the melting point of zinc, the paste forms conductors or electrodes of ceramic capacitors, varistors or the like. The capacitors or varistors having their conductors or electrodes thus prepared from the zinc paste are approximately equivalent in electrical and mechanical properties to those having their conductors or electrodes fabricated from a conventional silver paste.

6 Claims, 5 Drawing Figures

ELECTRONCONDUCTIVE PASTE TO BE BAKED ON CERAMIC BODIES TO PROVIDE CAPACITORS, VARISTORS OR THE LIKE

This is a division, of application Ser. No. 349,312, filed Feb. 16, 1982 now abandoned.

This invention relates to a novel electroconductive composition in paste form, and more specifically to such an electroconductive paste to be baked or fired on ceramic bodies for use as conductors or electrodes of ceramic capacitors, varistors or the like.

As is well known, in the fabrication of ceramic capacitors or ceramic varistors, the conductors or electrodes are formed by baking the coatings of electroconductive pastes on ceramic bodies. Typical of such pastes as heretofore used is what is known as a silver paste, composed of powdered silver, a glass frit, and a vehicle or the liquid ingredient or ingredients of the paste. The silver paste is itself an excellent material for the purposes. When used for the conductors of ceramic capacitors, for example, it can provide desired capacitance, dielectric loss tangent (the tangent of the dielectric loss angle), and a firm bond between the conductors and ceramic bodies of the capacitors. Offsetting all these advantages, however, is the expensiveness of silver, a precious metal, which adds considerably to the costs of the electrical components.

The present invention solves the problem of the prior art by providing a materially less expensive substitute for the silver paste. Although inexpensive, the electronconductive paste in accordance with the invention provides the desired electrical properties in its intended use as conductors or electrodes of ceramic capacitors, varistors or the like. Further the conductors or electrodes made from the inventive paste adhere to the ceramic bodies with sufficient strength.

Stated broadly, the electroconductive paste in accordance with the invention is composed of 100 parts by weight of zinc powder, from about 0.01 to 10.00 parts by weight of a glass frit, and a vehicle for pasting the mixture of the zinc powder and the glass frit. As required or desired, the paste may contain an additive or additives typically selected from the oxides of some metallic elements.

The zinc paste, as the electroconductive paste of this invention will hereinafter be so called for simplicity, is not just a cheap substitute for the silver paste. When the zinc paste is used as the conductors of strontium titanate ceramic semiconductor capacitors, for example, by being fired on the ceramic bodies, the capacitance of the capacitors is even higher than that of conventional capacitors with their conductors made from the silver paste. Thus the zinc paste can reduce the size of capacitors of this class for a given capacitance. To give another example, titanium dioxide ceramic varistors having their electrodes made from the zinc paste are just as excellent in electrical and mechanical properties as those having the conventional silver electrodes. Both of these applications of the zinc paste will be discussed in more detail in the subsequent disclosure of specific Examples of the invention.

Among the advantages offered by the zinc paste is that it admits of baking or firing in atmosphere. This is because, filling the interstices of the zinc powder, the glass ingredients of the paste limits the oxidation of the individual zinc particles. For this reason the electrical ceramic components with the zinc conductors or electrodes are mass producible at reduced costs. As regards the inexpensiveness of the zinc paste itself, suffice it to say that powdered zinc is available at approximately 1/200 the cost of powdered silver.

The above and other features and advantages of this invention and the manner of attaining them will become more apparent, and the invention itself will best be understood, from a study of the following detailed description taken together with the attached drawings, in which.

Zinc powder constituting the principal ingredient of the zinc paste of this invention is, for the best results, of spherical particles with a size of not more than about 15 microns. In practice, however, the particle size can average from about 0.1 to 30.0 microns.

From about 0.01 to 10.00 parts by weight, preferably from one to five parts by weight, of a glass frit or frits is added to 100 parts by weight of zinc powder. The glass frit is intended to function as inorganic binder and oxidation inhibitor. Should the proportion of the glass frit be less than about 0.01 part by weight, it would hardly perform these functions and would give rise to fluctuations in some physical properties of the ceramic components concerned on mass production. If the glass frit content of the zinc paste were more than about 10 parts by weight, on the other hand, then the conductors or electrodes made from the paste would offer too much electrical resistance and would make the dielectric loss tangent of the capacitors too high.

Preferred examples of glass frits include those composed of litharge (PbO), boric oxide ($B_2O_3$) and silica ($SiO_2$), of PbO and $B_2O_3$, and of zinc oxide (ZnO), $B_2O_3$ and $SiO_2$, all with a softening point ranging from about 415° to 625° C. and with about 325-mesh particles. Other frit compositions are adoptable as well, such as those comprising any two or more of such metal oxides as PbO, $B_2O_3$, $SiO_2$, ZnO, red lead oxide ($Pb_3O_4$), barium oxide (BaO), zirconium oxide ($ZrO_2$), calcium carbonate ($CaCO_3$), aluminum oxide ($Al_2O_3$), and bismuth trioxide ($Bi_2O_3$). The softening points of such adoptable glass frits can be in the range of about 400°–800° C.

A preferred example of the vehicle for pasting the mixture of zinc powder and a glass frit or frits is alpha-terpineol containing from two to 20% by weight ethylcellulose as an organic binder, or that containing from two to 20% by weight nitrocellulose or polyvinyl alcohol. Instead of alpha-terpineol as a solvent there may be employed butyl "Carbitol" (trademark for diethylene glycol mono-n-butyl ether), butyl "Carbitol" acetate (trademark for diethylene glycol mono-n-butyl ether acetate), or dioctyl phthalate.

Whichever substance is employed, the vehicle will evaporate when the zinc paste is baked on ceramic bodies, and so will be substantially absent from the completed conductive regions on the ceramic bodies. Thus a wide variety of well known organic vehicles fund use as a pasting agent within the scope of this invention.

Any selected vehicle is to be used in an amount suitable for pasting the zinc mixture. The amount of the vehicle normally ranges from 10 to 50% by weight, preferably from 15 to 25% by weight, and most desirably from 19 to 21% by weight, of the combined weight of zinc powder and a glass frit or frits, together with or without an additive or additives to be referred to subsequently. The viscosity of the paste would become too high if the amount of the vehicle were less than 10% by weight, and too low if the amount of the vehicle were more than 50% by weight.

Such being the basic composition of the zinc paste in accordance with the invention, it will now be discussed how it forms conductive regions on ceramic bodies when fired. The discussion will make clear that the use of zinc powder as the main ingredient of the paste is no arbitrary choice but an outcome of extensive experimentation.

Figure 1:
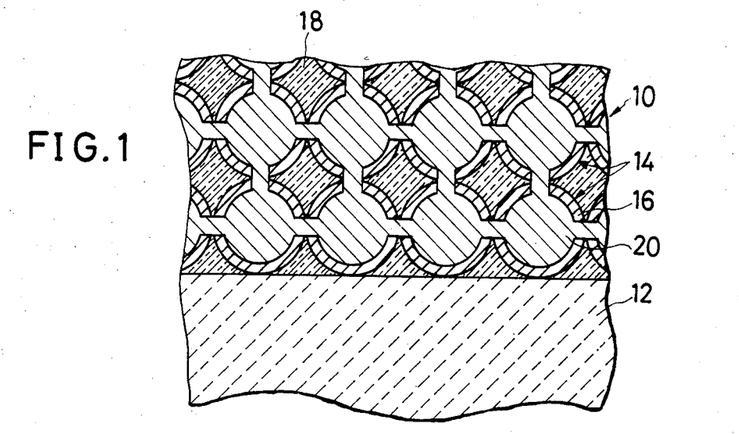
FIG. 1 is a fragmentary sectional view diagrammatically illustrating, on a greatly magnified scale, a conductive region formed on a ceramic body from the zinc paste of this invention, the view being explanatory of the way in which the unoxidized interiors of the zinc particles become fused to each other on baking.

FIG. 1 is explanatory of the unique behavior of the zinc paste on firing. This figure is a greatly enlarged, fragmentary section through, for instance, a ceramic capacitor comprising a conductor 10 and a ceramic body 12. The conductor 10 is made from the zinc paste, coated on the ceramic body 12 and baked for several tens of minutes at a temperature above the melting point (419.5° C.) of the zinc powder. When so treated, each zinc particle 14 is oxidized and bears an oxide cladding 16. The oxidation of the zinc powder does not proceed deep into each particle 14 as the glass 18 fills the interstices of the zinc powder. Further, while being baked, the unoxidized interiors 20 of the zinc particles 14 melt and expand at a greater rate than their oxide claddings 16, until the zinc interiors disrupt the oxide claddings and become fused to each other to form the conductor 10. Thus the zinc paste is well suited as a material for conductors or electrodes of some electrical ceramic components. It may be noted that the fusion of the unoxidized interiors of zinc particles to each other on baking involes a process different from the cohesion of metal particles by sintering.

As had been mentioned, the zinc paste of this invention may additionally comprise from about 0.01 to 5.00 parts by weight of one or more of such additives as, generally, lead (Pb), bismuth (Bi), praseodymium (Pr), copper (Cu), cadmium (Cd), and the compounds of each of these metallic elements. The zinc paste containing such an additive or additives, when baked on ceramic bodies, will adhere thereto more firmly. If used for the conductors of ceramic capacitors, moreover, the zinc paste with such an additive or additives will afford higher capacitance and smaller dielectric loss tangent.

More specific, preferred examples of the additives are the oxides of the listed metallic elements such as $Pb_3O_4$, $Bi_2O_3$, praseodymia ($Pr_6O_{11}$), black copper oxide (CuO), and cadmium oxide (CdO), with a particle size ranging from about 0.1 to 15.0 microns. Uncompounded metals such as those enumerated above are adoptable as well, however. The metals will be converted into oxides upon baking of the zinc paste. Additional examples of additives are PbO, lead dioxide ($PbO_2$), lead tetraacetate ($Pb(CH_3COO)_4$), $Pr_2(C_2H_4O_2)_3$, red copper oxide ($Cu_2O$), and bismuth citrate ($BiC_6H_5O_7$). The hydroxides, salts such as carbonates and oxalates, and peroxides of the metals may also be employed. In short the zinc paste may contain any additive that will become a metal oxide when the paste is baked in a temperature range of, for example 500° to 900° C. for 10 to 50 minutes.

Experiment has proved that if the proportion of the additive or additives is less than about 0.01 part by weight, no substantial improvements result in such properties of the electrical components as capacitance, dielectric loss tangent, and the strength with which the conductive regions adhere to the ceramic bodies against tensile loading. Such properties may also fluctuate considerably from component to component on mass production if the additive content of the paste is insufficient. If the amount of the additive or additives exceeds about five parts by weight, on the other hand, then the tensile strength will decrease, and the dielectric loss tangent in particular will deteriorate.

Described hereinbelow are Examples of the invention, dealing with specific examples of the zinc paste as actually produced in accordance with the principles of the invention, and the physical properties of the ceramic capacitors and varistors having conductors or electrodes made from the zinc paste examples. These Examples, however, are meant purely to illustrate or explain and not to impose limitations upon the invention.

EXAMPLES 1–5

To 100 parts by weight of zinc powder there was added a glass frit in five different proportions ranging from 0.01 to 10.00 parts by weight, as set forth in Table 1. About 20% by weight of a vehicle was admixed with the mixtures of the zinc powder and the glass frit, and the admixtures were agitated for 15 hours, thereby preparing the five zinc pastes of Examples 1 to 5.

The zinc powder in use was of spherical particles with diameters up to 15 microns and was of such purity as to contain about 0.01% by weight of impurities such as cadmium and iron. (The zinc powder used in all the other Examples presented subsequently was of the same grade.) The glass frit in use was the mixture of six parts by weight PbO, two parts by weight $B_2O_3$, and two parts by weight $SiO_2$, having a softening point of 560° C. and 325-mesh particles. As the vehicle there was employed alpha-terpineol admixed with 5% by weight ethylcellulose as an organic binder. (The same vehicle was used in all the following Examples.)

Figure 2:
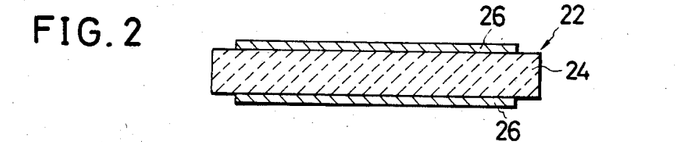
FIG. 2 is a diametrical section through a ceramic capacitor having conductors made from the zinc paste.

The above prepared five examples of the zinc paste were each coated on opposite faces of each of several discs of ceramic semiconductor material composed principally of strontium titanate, $SrTiO_3$, and were baked thereon. FIG. 2 is a section through each ceramic capacitor 22 thus fabricated, showing the ceramic disc 24 and the pair of zinc conductors 26 on its opposite faces. A more detailed discussion of the ceramic capacitors and the method of their fabrication follows.

The ceramic discs 24 of the capacitors 22 were prepared from a mixture of 98.8 mole % $SrTiO_3$, 0.8 mole % germanium dioxide, $GeO_2$, and 0.4 mole % niobium oxide, $Nb_2O_5$, admixed with polyvinyl alcohol as an organic binder. After having been agitated, the mixture was molded into discs at a pressure of approximately one ton per square centimeter. The disc-like moldings were baked for three hours at a temperature of 1420° C. in a furnace, in which there was a gaseous atmosphere of 98% by capacity of molecular nitrogen ($N_2$) and 2% by capacity of molecular hydrogen ($H_2$). The ceramic dics thus formed had each a diameter of eight millimeters (mm) and a thickness of 0.4 mm. The discs were then coated with a $PbO$—$B_2O_3$—$Bi_2O_3$ glass paste. The coated ceramic discs were heated and held at a temperature of 1200° C. for three hours, thereby causing diffusion of the glass ingredients into the ceramic to insulate its particles.

For the fabrication of the conductors on the opposite faces of each ceramic disc the zinc paste of the above specified composition was first "printed" on one face of the disc through a 200-mesh Teflon (trademark) screen. The coated discs were placed in a drying furnace for drying the coatings at 150° C. for 10 minutes. Then the zinc paste was coated on the other face of each disc, and the coatings were dried in the same manner. Then, placed on an iron net, the ceramic discs with the dried coatings were introduced into a tunnel-shaped heater, in which the coatings were baked at approximately 700° C., above the melting point of zinc, for 10 minutes in exposure to atmosphere. The coated ceramic discs were held in the heater for a total of 40 minutes including the time for raising and lowering its temperature. There were thus completed the conductors 26 of FIG. 2, each having a diameter of 7.8 mm and a thickness of 15 microns.

As has been explained in conjunction with FIG. 1, the heating of the zinc paste coatings in atmosphere, as above, causes oxidation of the zinc particles. Being surrounded by the glass, however, each zinc particle undergoes oxidation only to a limited depth from its surface. It has also been mentioned that the zinc paste of this invention is baked at a temperature above the melting point of zinc, unlike the conventional silver paste which is fired at a temperature below the melting point of silver. Thus the unoxidized interiors of the zinc particles melt and, disrupting the oxide claddings, become bridged to each other.

During such baking of the coatings the vehicle of the zinc paste evaporates. The zinc powder and the glass frit, on the other hand, combine as in FIG. 1 by the baking to make up the conductors.

The ceramic capacitors with the zinc conductors prepared as above were tested as to capacitance, dielectric loss tangent, and the strength with which the conductors were bonded to the ceramic discs against pulling stress. Table 1 gives the results. In this and all the succeeding tables each listed value is the average of ten samples. Also, in all the tables given herein, the capacitance of the capacitors represents the values measured at a frequency of 1 kHz, in nonofarads (nF), and the dielectric loss tangent represents 100 times the values measured at 1 kHz. For the actual values of dielectric loss tangent, therefore, the tabulated figures should be multiplied by $10^{-2}$.

Figure 3:
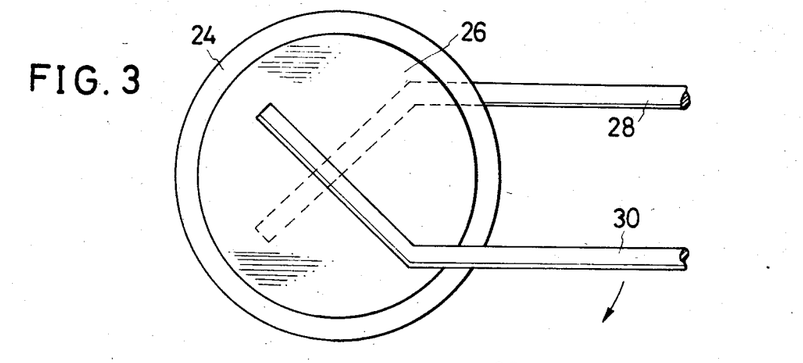
FIG. 3 is a plan view explanatory of the way in which the ceramic capacitor is tested as to the strength with which the conductors adhere to the ceramic body against tensile stress.

FIG. 3 explains the method adopted for measurement of the strength with which the zinc conductors 26 adhere to the ceramic disc 24 of each capacitor. There were first prepared two annealed copper wires 28 and 30 for each capacitor, each wire having a diameter of 0.6 mm and a length of 35.0 mm. Each wire was bent at a point approximately 4 mm from one end, as shown. The bent end of each wire was soldered to one of the conductors 26 of each capacitor with application of ultrasonic vibration. Then, with one wire 28 held against movement, the other was pulled slowly via a spring scale in the arrow marked direction, until either of the conductors came off the ceramic disc 24. The reading in kilograms (kg) of the spring scale at that moment is given as the tensile strength of each capacitor.

TABLE 1

| Examples | $PbO$—$B_2O_3$—$SiO_2$ glass frit, weight part | Capacitance nF | Dielectric loss tangent, $\times 10^{-2}$ | Tensile strength, kg |
| --- | --- | --- | --- | --- |
| 1 | 0.01 | 54 | 1.47 | 1.1 |
| 2 | 0.10 | 58 | 1.09 | 1.8 |
| 3 | 1.00 | 60 | 0.91 | 2.0 |
| 4 | 5.00 | 58 | 1.18 | 1.6 |
| 5 | 10.00 | 54 | 1.46 | 1.1 |

By way of comparison there was prepared a silver paste composed of 60% by weight of spherical silver particles sized 0.1 to 3.0 microns, 2% by weight $PbO$—$B_2O_3$—$SiO_2$ glass frit with a softening point of 550° C., and 20% by weight of a vehicle, in accordance with the prior art. The silver paste was coated on opposite faces of $SrTiO_3$ ceramic discs identical with those used in the above Examples of the invention. As had been conventionally practiced with the silver paste, the coatings on the ceramic discs were baked at a temperature less than the melting point of silver, to form conductors each with a diameter of 7.8 mm and a thickness of three microns. Measured under the same conditions as those specified above, the capacitance of the thus fabricated conventional capacitors averaged 47 nF, their dielectric loss tangent $0.56 \times 10^{-2}$, and their tensile strength 1.5 kg.

From these figures, and in consideration of the characteristics of the capacitors with the silver conductors, the acceptable criteria of the three properties in question for any capacitors with the $SrTiO_3$ semiconductor ceramic bodies will now be determined as follows: capacitance, not less than 47 nF; dielectric loss tangent, not more than $1.5 \times 10^{-2}$; and tensile strength, not less than 0.5 kg.

An inspection of Table 1 will reveal that the capacitors with their conductors made from the zinc pastes containing from about 0.01 to 10.00 parts by weight of the $PbO$—$B_2O_3$—$SiO_2$ glass frit with respect to 100 parts by weight of zinc powder in accordance with the invention all satisfy the above criteria of capacitance, dielectric loss tangent, and tensile strength. Consider the capacitor of Example 3 in particular, with its conductors fabricated from the zinc paste containing one part by weight of the glass frit. Although its dielectric loss tangent is some-what unsatisfactory, the capacitance and tensile strength are much better than the acceptable criteria. For a given capacitance, therefore, the zinc paste makes it possible to reduce the size of capacitors of this class. Further, since the zinc paste of this invention allows baking in atmosphere as aforesaid, the capacitors are mass producible, and at drastically reduced costs because of the cheapness of zinc compared with silver.

It has been experimentally confirmed that if the proportion of the glass frit falls short of 0.01 part by weight or exceeds 10.00 parts by weight, the zinc paste makes the dielectric loss tangent of capacitors higher than the above established criterion of $1.5 \times 10^{-2}$. As is evident from Table 1, however, the glass frit content of the zinc paste should preferably be in the range of about one to five parts by weight.

EXAMPLES 6-62

In these Examples there were tried glass frits of several different compositions, in various combinations and in various proportions. The glass frits prepared were the following eight, referenced A to H for convenience:

A: The glass frit used in Examples 1-5.
B: $PbO-B_2O_3-SiO_2$; softening point (s.p.) 460° C.
C: $PbO-B_2O_3-SiO_2$; s.p. 600° C.
D: $PbO-B_2O_3$; s.p. 415° C.
E: $PbO-B_2O_3$; s.p. 430° C.
F: $ZnO-B_2O_3-SiO_2$; s.p. 560° C.
G: $ZnO-B_2O_3-SiO_2$; s.p. 625° C.
H: $PbO-B_2O_3-SiO_2$; s.p. 500° C.

Two or more of these glass frits A to H were variously combined, in various proportions, as specified in Table 2. To 100 parts by weight of zinc powder each combination of glass frits was added in several different proportions also given in Table 2. Approximately 20% by weight of the vehicle used in Examples 1-5 was admixed with each mixture of the zinc powder and the glass frits. The admixtures were agitated for 15 hours, thus preparing the fifty-seven zinc pastes of Examples 6-62. Capacitors were fabricated by use of these zinc pastes through the procedure of Examples 1-5, and their capacitance, dielectric loss tangent, and tensile strength were measured by the same methods as in Examples 1-5. Table 2 represents the results.

In Table 2 the glass frits in use are designated by their reference characters A to H, and the proportions of the frits of each combination are given by weight. Take, for example, the zinc paste of Example 6. This paste uses a combination of the $PbO-B_2O_3-SiO_2$ glass frit B, with a softening point of 460° C., and the $PbO-B_2O_3-SiO_2$ glass frit C, with a softening point of 600° C., in a ratio by weight of 1 to 4. To 100 parts by weight of zinc powder 0.01 part by weight of the combination of the glass frits B and C is added to form the zinc paste in admixture with about 20% by weight of the vehicle.

The results of Table 2 prove that the use of the glass frits having compositions and softening points other than those of the glass frit A of Examples 1-5 can provide zinc pastes suitable for use as the conductors of ceramic capacitors. This holds true if two or more of the glass frits are employed in various combinations and in various proportions.

TABLE 2

| Examples | Total amount of glass frits weight part | Glass frits in use and their weight ratio | Capacitance, nF | Dielectric loss tangent, $\times 10^{-2}$ | Tensile strength, kg |
|---|---|---|---|---|---|
| 6 | 0.01 | B:C = 1:4 | 54 | 1.46 | 1.1 |
| 7 | 0.01 | B:C = 1:1 | 54 | 1.46 | 1.2 |
| 8 | 0.01 | B:C = 4:1 | 55 | 1.45 | 1.2 |
| 9 | 0.10 | B:C = 1:4 | 58 | 1.03 | 1.7 |
| 10 | 0.10 | B:C = 1:1 | 59 | 1.02 | 1.8 |
| 11 | 0.10 | B:C = 4:1 | 59 | 1.00 | 1.9 |
| 12 | 1.00 | B:C = 1:4 | 61 | 0.82 | 2.1 |
| 13 | 1.00 | B:C = 1:1 | 61 | 0.81 | 2.2 |
| 14 | 1.00 | B:C = 4:1 | 61 | 0.79 | 2.2 |
| 15 | 5.00 | B:C = 4:1 | 57 | 1.04 | 1.6 |
| 16 | 5.00 | B:C = 1:1 | 56 | 1.06 | 1.6 |
| 17 | 5.00 | B:C = 1:4 | 57 | 1.01 | 1.7 |
| 18 | 10.00 | B:C = 4:1 | 54 | 1.40 | 1.1 |
| 19 | 10.00 | B:C = 1:1 | 53 | 1.39 | 1.0 |
| 20 | 10.00 | B:C = 1:4 | 53 | 1.38 | 1.1 |
| 21 | 0.01 | D:A = 1:4 | 53 | 1.45 | 1.0 |
| 22 | 0.01 | D:A = 1:1 | 54 | 1.42 | 1.1 |
| 23 | 0.01 | D:A = 4:1 | 54 | 1.44 | 1.2 |
| 24 | 0.10 | D:A = 1:4 | 59 | 1.00 | 1.8 |
| 25 | 0.10 | D:A = 1:1 | 59 | 1.01 | 1.9 |
| 26 | 0.10 | D:A = 4:1 | 59 | 1.05 | 1.9 |
| 27 | 1.00 | D:A = 1:4 | 61 | 0.86 | 2.0 |
| 28 | 1.00 | D:A = 1:1 | 60 | 0.81 | 2.1 |
| 29 | 1.00 | D:A = 4:1 | 61 | 0.80 | 2.0 |
| 30 | 5.00 | D:A = 1:4 | 57 | 1.03 | 1.6 |
| 31 | 5.00 | D:A = 1:1 | 57 | 1.02 | 1.7 |
| 32 | 5.00 | D:A = 4:1 | 56 | 1.02 | 1.6 |
| 33 | 10.00 | D:A = 1:4 | 54 | 1.41 | 1.0 |
| 34 | 10.00 | D:A = 1:1 | 54 | 1.42 | 1.0 |
| 35 | 10.00 | D:A = 4:1 | 55 | 1.44 | 1.2 |
| 36 | 0.01 | D:E = 1:1 | 54 | 1.44 | 1.0 |
| 37 | 1.00 | D:E = 1:1 | 60 | 0.80 | 2.1 |
| 38 | 10.00 | D:E = 1:1 | 53 | 1.39 | 1.1 |
| 39 | 0.01 | F:G = 1:1 | 54 | 1.45 | 1.0 |
| 40 | 0.10 | F:G = 1:1 | 61 | 0.82 | 2.0 |
| 41 | 10.00 | F:G = 1:1 | 54 | 1.40 | 1.2 |
| 42 | 0.01 | G:B = 1:1 | 53 | 1.45 | 1.1 |
| 43 | 1.00 | G:B = 1:1 | 60 | 0.80 | 2.1 |
| 44 | 10.00 | G:B = 1:1 | 55 | 1.41 | 1.0 |
| 45 | 0.01 | F:D = 1:1 | 54 | 1.42 | 1.1 |
| 46 | 1.00 | F:D = 1:1 | 61 | 0.85 | 2.2 |
| 47 | 10.00 | F:D = 1:1 | 53 | 1.43 | 1.2 |
| 48 | 0.01 | D:A:G = 1:1:1 | 54 | 1.40 | 1.2 |
| 49 | 0.10 | D:A:G = 1:1:1 | 58 | 0.96 | 1.9 |
| 50 | 1.00 | D:A:G = 1:1:1 | 61 | 0.63 | 2.1 |
| 51 | 5.00 | D:A:G = 1:1:1 | 57 | 0.97 | 1.7 |
| 52 | 10.00 | D:A:G = 1:1:1 | 54 | 1.39 | 1.1 |
| 53 | 0.01 | D:B:A:G = 1:1:1:1 | 53 | 1.41 | 1.1 |

TABLE 2-continued

| Examples | Total amount of glass frits weight part | Glass frits in use and their weight ratio | Capacitor properties | | |
|---|---|---|---|---|---|
| | | | Capacitance, nF | Dielectric loss tangent, $\times 10^{-2}$ | Tensile strength, kg |
| 54 | 0.10 | D:B:A:G = 1:1:1:1 | 57 | 1.00 | 1.8 |
| 55 | 1.00 | D:B:A:G = 1:1:1:1 | 60 | 0.71 | 2.0 |
| 56 | 5.00 | D:B:A:G = 1:1:1:1 | 57 | 0.99 | 1.8 |
| 57 | 10.00 | D:B:A:G = 1:1:1:1 | 54 | 1.40 | 1.2 |
| 58 | 0.01 | D:B:H:A:G = 1:1:1:1:1 | 54 | 1.42 | 1.2 |
| 59 | 0.10 | D:B:H:A:G = 1:1:1:1:1 | 57 | 0.99 | 1.7 |
| 60 | 1.00 | D:B:H:A:G = 1:1:1:1:1 | 61 | 0.73 | 2.0 |
| 61 | 5.00 | D:B:H:A:G = 1:1:1:1:1 | 57 | 1.01 | 1.9 |
| 62 | 10.00 | D:B:H:A:G = 1:1:1:1:1 | 53 | 1.41 | 1.3 |

EXAMPLES 63–82

As specified in Table 3, various proportions of $PbO$—$B_2O_3$—$SiO_2$ glass frit of Examples 1–5, ranging from 0.01 to 10.00 parts by weight, and various proportions of powdered $Pb_3O_4$ as an additive, ranging from 0.01 to 5.00 parts by weight, were added to 100 parts by weight of zinc powder. The $Pb_3O_4$ powder had a particle size from 0.1 to 15.0 microns. About 20% by weight of the vehicle set forth in Examples 1–5 was admixed with the various mixtures of the noted ingredients. The admixtures were agitated for 15 hours thereby preparing the twenty zinc pastes of Examples 63–82. Capacitors were produced by use of these zinc pastes through the procedure of Examples 1–5, and their capacitance, dielectric loss tangent, and tensile strength were measured by the same methods as in Examples 1–5. Table 3 represents the results.

The tabulated results indicate that the addition of $Pb_3O_4$ improves all the three properties in question of the capacitors, and in particular their dielectric loss tangent and tensile strength. The reason for this seems to be the improved state of the interfaces between the ceramic bodies and conductors of the capacitors due to the addition of $Pb_3O_4$. Particular attention is directed to Example 73, which represents the zinc paste containing one part by weight of the glass frit and one part by weight of $Pb_3O_4$. The properties of the capacitors formed by use of this zinc paste are better than those of the conventional capacitors with the silver conductors.

The proportion of $Pb_3O_4$ should range from about 0.01 to 5.00 parts by weight, preferably from 0.1 to 1.0 part by weight. Should the additive be used in an amount outside the range of 0.01 to 5.00 parts by weight, the dielectric loss tangent of the resulting capacitors would exceed the acceptable maximum of $1.5 \times 10^{-2}$.

TABLE 3

| Examples | Paste ingredients | | Capacitor properties | | |
|---|---|---|---|---|---|
| | $PbO$—$B_2O_3$—$SiO_2$ glass frit, weight part | $Pb_3O_4$ (additive), weight part | Capacitance, nF | Dielectric loss tangent, $\times 10^{-2}$ | Tensile strength, kg |
| 63 | 0.01 | 0.01 | 55 | 1.40 | 1.1 |
| 64 | 0.01 | 1.10 | 56 | 1.32 | 1.2 |
| 65 | 0.01 | 1.00 | 61 | 0.88 | 1.3 |
| 66 | 0.01 | 5.00 | 55 | 1.44 | 1.1 |
| 67 | 1.10 | 0.01 | 59 | 1.03 | 1.8 |
| 68 | 0.10 | 0.10 | 60 | 0.98 | 1.9 |
| 69 | 0.10 | 1.00 | 63 | 0.65 | 2.0 |
| 70 | 0.10 | 5.00 | 58 | 1.07 | 1.7 |
| 71 | 1.00 | 0.01 | 61 | 0.86 | 2.0 |
| 72 | 1.00 | 0.10 | 61 | 0.82 | 2.0 |
| 73 | 1.00 | 1.00 | 64 | 0.55 | 2.1 |
| 74 | 1.00 | 5.00 | 60 | 0.89 | 1.6 |
| 75 | 5.00 | 0.01 | 58 | 1.12 | 1.6 |
| 76 | 5.00 | 0.10 | 58 | 1.06 | 1.7 |
| 77 | 5.00 | 1.00 | 62 | 0.71 | 1.7 |
| 78 | 5.00 | 5.00 | 57 | 1.16 | 1.4 |
| 79 | 10.00 | 0.01 | 56 | 1.39 | 1.1 |
| 80 | 10.00 | 0.10 | 56 | 1.31 | 1.2 |
| 81 | 10.00 | 1.00 | 61 | 0.88 | 1.2 |
| 82 | 10.00 | 5.00 | 54 | 1.43 | 1.0 |

EXAMPLES 83–102

As specified in Table 4, various proportions of $PbO$—$B_2O_3$—$SiO_2$ glass frit of Examples 1–5, ranging from 0.01 to 10.00 parts by weight, and various proportions of powdered $Bi_2O_3$, an additive, ranging from 0.01 to 5.00 parts by weight, were added to 100 parts by weight of zinc powder. The $Bi_2O_3$ powder had a particle size ranging from 0.1 to 15.0 microns. About 20% by weight of the same vehicle as in Examples 1–5 was admixed with the various mixtures of the above ingredients. The admixtures were agitated for 15 hours to prepare the twenty different zinc pastes of Examples 83–102. Capacitors were fabricated by use of these zinc pastes through the same procedure as in Examples 1–5, and their capacitance, dielectric loss tangent, and tensile strength were measured by the same methods as in Examples 1–5. Table 4 represents the results. It will be observed from this table that the addition of $Bi_2O_3$ in the specified range of proportions gives just as favorable results as does the addition of $Pb_3O_4$ as in Examples 63–82.

TABLE 4

| Examples | Paste ingredients | | Capacitor properties | | |
|---|---|---|---|---|---|
| | PbO—$B_2O_3$—$SiO_2$ glass frit, weight part | $Bi_2O_3$ (additive), weight part | Capacitance, nF | Dielectric loss tangent, $\times 10^{-2}$ | Tensile strength, kg |
| 83 | 0.01 | 0.01 | 55 | 1.41 | 1.1 |
| 84 | 0.01 | 0.10 | 57 | 1.29 | 1.2 |
| 85 | 0.01 | 1.00 | 61 | 0.84 | 1.2 |
| 86 | 0.01 | 5.00 | 55 | 1.45 | 1.1 |
| 87 | 0.10 | 0.01 | 59 | 1.05 | 1.7 |
| 88 | 0.10 | 0.10 | 60 | 0.96 | 1.8 |
| 89 | 0.10 | 1.00 | 63 | 0.62 | 1.9 |
| 90 | 0.10 | 5.00 | 58 | 1.08 | 1.7 |
| 91 | 1.00 | 0.01 | 60 | 0.87 | 1.9 |
| 92 | 1.00 | 0.10 | 59 | 0.80 | 2.0 |
| 93 | 1.00 | 1.00 | 64 | 0.52 | 2.1 |
| 94 | 1.00 | 5.00 | 60 | 0.90 | 1.9 |
| 95 | 5.00 | 0.01 | 58 | 1.13 | 1.9 |
| 96 | 5.00 | 0.10 | 58 | 1.04 | 1.5 |
| 97 | 5.00 | 1.00 | 63 | 0.67 | 1.6 |
| 98 | 5.00 | 5.00 | 57 | 1.17 | 1.5 |
| 99 | 10.00 | 0.01 | 55 | 1.40 | 1.1 |
| 100 | 10.00 | 0.10 | 57 | 1.28 | 1.2 |
| 101 | 10.00 | 1.00 | 61 | 0.83 | 1.3 |
| 102 | 10.00 | 5.00 | 54 | 1.47 | 1.1 |

EXAMPLES 103–122

To 100 parts by weight of zinc powder there are added PbO—$B_2O_3$—$SiO_2$ glass frit of Examples 1–5 in various proportions ranging from 0.01 to 10.00 parts by weight, and powdered $Pr_6O_{11}$, an additive, in various proportions ranging from 0.01 to 5.00 parts by weight, as specified in Table 5. The $Pr_6O_{11}$ powder had a particle size from 0.1 to 15.0 microns. The various mixtures of the noted ingredients were admixed with about 20% by weight of the same vehicle as used in Examples 1–5. The admixtures were agitated for 15 hours to prepare the twenty different zinc pastes of Examples 103–122. Capacitors were fabricated by use of these zinc pastes through the same procedure as in Examples 1–5, and their capacitance, dielectric loss tangent, and tensile strength were measured also by the same methods as in Examples 1–5. Table 5 represents the results. It will be seen from this table that the addition of $Pr_6O_{11}$ in the range of 0.01–5.00 parts by weight provides just as favorable results as does the addition of $Pb_3O_4$ as in Examples 63–82.

EXAMPLES 123–142

To 100 parts by weight of zinc powder there were added PbO—$B_2O_3$—$SiO_2$ glass frit of Examples 1–5 in various proportions ranging from 0.01 to 10.00 parts by weight, and powdered CuO, an additive, in various proportions ranging from 0.01 to 5.00 parts by weight, as listed in Table 6. The CuO powder had a particle size from 0.1 to 15.0 microns. The various mixtures of the zinc powder, glass frit and CuO powder were each admixed with about 20% by weight of the same vehicle as used in Examples 1–5. The admixtures were agitated for 15 hours thereby providing the twenty different zinc pastes of Examples 123–142.

Capacitors were fabricated by use of these zinc pastes through the same procedure as in Examples 1–5, and their capacitance, dielectric loss tangent, and tensile strength were measured also by the same methods as in Examples 1–5. Table 6 represents the results. It will be appreciated from the tabulated properties of the capacitors that the addition of CuO in the range of 0.01 to 5.00

TABLE 5

| Examples | Paste ingredients | | Capacitor properties | | |
|---|---|---|---|---|---|
| | PbO—$B_2O_3$—$SiO_2$ glass frit, weight part | $Pr_6O_{11}$ (additive), weight part | Capacitance, nF | Dielectric loss tangent, $\times 10^{-2}$ | Tensile strength, kg |
| 103 | 0.01 | 0.01 | 55 | 1.42 | 1.1 |
| 104 | 0.01 | 0.10 | 56 | 1.28 | 1.2 |
| 105 | 0.01 | 1.00 | 60 | 0.86 | 1.8 |
| 106 | 0.01 | 5.00 | 54 | 1.48 | 1.2 |
| 107 | 0.10 | 0.01 | 58 | 1.07 | 1.7 |
| 108 | 0.10 | 0.10 | 60 | 0.99 | 1.8 |
| 109 | 0.10 | 1.00 | 62 | 0.68 | 1.8 |
| 110 | 0.10 | 5.00 | 58 | 1.10 | 1.4 |
| 111 | 1.00 | 0.01 | 61 | 0.89 | 1.9 |
| 112 | 1.00 | 0.10 | 61 | 0.85 | 2.0 |
| 113 | 1.00 | 1.00 | 63 | 0.60 | 2.1 |
| 114 | 1.00 | 5.00 | 60 | 0.93 | 1.8 |
| 115 | 5.00 | 0.01 | 57 | 1.16 | 1.5 |
| 116 | 5.00 | 0.10 | 58 | 1.09 | 1.6 |
| 117 | 5.00 | 1.00 | 62 | 0.73 | 1.7 |
| 118 | 5.00 | 5.00 | 57 | 1.20 | 1.5 |
| 119 | 10.00 | 0.01 | 55 | 1.42 | 1.1 |
| 120 | 10.00 | 0.10 | 56 | 1.29 | 1.2 |
| 121 | 10.00 | 1.00 | 61 | 0.84 | 1.3 |
| 122 | 10.00 | 5.00 | 54 | 1.49 | 1.1 | parts by weight provides just as favorable results as does the addition of $Pb_3O_4$ as in Examples 63-82.

range of 0.01 to 5.00 parts by weight provides just as favorable results as does the addition of $Pb_3O_4$ as in Examples 63-82.

TABLE 6

| | Paste ingredients | | Capacitor properties | | |
|---|---|---|---|---|---|
| Examples | $PbO$—$B_2O_3$—$SiO_2$ glass frit, weight part | CuO (additive), weight part | Capacitance, nF | Dielectric loss tangent, $\times 10^{-2}$ | Tensile strength, kg |
| 123 | 0.01 | 0.01 | 55 | 1.43 | 1.1 |
| 124 | 0.01 | 0.10 | 56 | 1.30 | 1.1 |
| 125 | 0.01 | 1.00 | 61 | 0.87 | 1.2 |
| 126 | 0.01 | 5.00 | 55 | 1.43 | 1.1 |
| 127 | 0.10 | 0.01 | 59 | 1.03 | 1.7 |
| 128 | 0.10 | 0.10 | 60 | 0.99 | 1.7 |
| 129 | 0.10 | 1.00 | 63 | 0.66 | 1.8 |
| 130 | 0.10 | 5.00 | 59 | 1.04 | 1.7 |
| 131 | 1.00 | 0.01 | 60 | 0.90 | 1.8 |
| 132 | 1.00 | 0.10 | 61 | 0.84 | 2.1 |
| 133 | 1.00 | 1.00 | 64 | 0.59 | 2.1 |
| 134 | 1.00 | 5.00 | 60 | 0.92 | 1.9 |
| 135 | 5.00 | 0.01 | 58 | 1.16 | 1.6 |
| 136 | 5.00 | 0.10 | 58 | 1.10 | 1.6 |
| 137 | 5.00 | 1.00 | 60 | 0.90 | 1.7 |
| 138 | 5.00 | 5.00 | 57 | 1.21 | 1.5 |
| 139 | 10.00 | 0.01 | 55 | 1.41 | 1.1 |
| 140 | 10.00 | 0.10 | 56 | 1.30 | 1.2 |
| 141 | 10.00 | 1.00 | 60 | 0.95 | 1.3 |
| 142 | 10.00 | 5.00 | 55 | 1.45 | 1.0 |

TABLE 7

| | Paste ingredients | | Capacitor properties | | |
|---|---|---|---|---|---|
| Examples | $PbO$—$B_2O_3$—$SiO_2$ glass frit, weight part | CdO (additive), weight part | Capacitance, nF | Dielectric loss tangent, $\times 10^{-2}$ | Tensile strength, kg |
| 143 | 0.01 | 0.01 | 55 | 1.40 | 1.1 |
| 144 | 0.01 | 0.10 | 57 | 1.26 | 1.1 |
| 145 | 0.01 | 1.00 | 61 | 0.84 | 1.2 |
| 146 | 0.01 | 5.00 | 55 | 1.42 | 1.1 |
| 147 | 0.10 | 0.01 | 59 | 1.01 | 1.7 |
| 148 | 0.10 | 0.10 | 60 | 0.92 | 1.9 |
| 149 | 0.10 | 1.00 | 63 | 0.64 | 2.0 |
| 150 | 0.10 | 5.00 | 58 | 1.12 | 1.7 |
| 151 | 1.00 | 0.01 | 61 | 0.84 | 2.0 |
| 152 | 1.00 | 0.10 | 61 | 0.79 | 2.1 |
| 153 | 1.00 | 1.00 | 64 | 0.57 | 2.1 |
| 154 | 1.00 | 5.00 | 59 | 1.00 | 1.9 |
| 155 | 5.00 | 0.01 | 57 | 1.14 | 1.6 |
| 156 | 5.00 | 0.10 | 58 | 1.05 | 1.7 |
| 157 | 5.00 | 1.00 | 62 | 0.73 | 1.8 |
| 158 | 5.00 | 5.00 | 57 | 1.20 | 1.7 |
| 159 | 10.00 | 0.01 | 55 | 1.41 | 1.1 |
| 160 | 10.00 | 0.10 | 56 | 1.29 | 1.2 |
| 161 | 10.00 | 1.00 | 60 | 0.90 | 1.3 |
| 162 | 10.00 | 5.00 | 55 | 1.44 | 1.2 |

EXAMPLES 143-162

To 100 parts by weight of zinc powder there were added $PbO$—$B_2O_3$—$SiO_2$ glass frit of Examples 1-5 in various proportions ranging from 0.01 to 10.00 parts by weight, and powdered CdO, an additive, in various proportions ranging from 0.01 to 5.00 parts by weight, as set forth in Table 7. The CdO powder had a particle size from 0.1 to 15.0 microns. The various mixtures of the zinc powder, glass frit and CdO were each admixed with about 20% by weight of the same vehicle as used in Examples 1-5. The admixtures were agitated for 15 hours thereby providing the twenty different zinc pastes of Examples 143-162.

Capacitors were fabricated by use of these zinc pastes through the same procedure as in Examples 1-5, and their capacitance, dielectric loss tangent, and tensile strength were measured also by the same methods as in Examples 1-5. Table 7 represents the results. It will be seen from this table that the addition of CdO in the

EXAMPLES 163-174

These Examples were intended to ascertain the results of the use of two or more of the above enumerated additives in the zinc paste of this invention. Thus, to 100 parts by weight of zinc powder, there were added various proportions of $PbO$—$B_2O_3$—$SiO_2$ glass frit of Examples 1-5, ranging from 0.01 to 10.00 parts by weight, and 0.1 part by weight each of two or more of the powders of $Pb_3O_4$, $Bi_2O_3$, $Pr_6O_{11}$, CuO and CdO as additives, as specified in Table 8. The various mixtures of the zinc powder, glass frit and additives were each admixed with about 20% by weight of the same vehicle as used in Examples 1-5. The admixtures were agitated for 15 hours to prepare the twelve different zinc pastes of Examples 163-174.

Capacitors were made by use of these zinc pastes through the same procedure as in Examples 1-5, and their capacitance, dielectric loss tangent, and tensile strength were measured also by the same methods as in Examples 1-5. Table 8 represents the results. As will be understood from the tabulated results, the use of two or more of the above powdered metal oxides as additives provides just as favorable results as in the foregoing Examples. Although each zinc paste of Examples 163-174 contain 0.2-0.5 part by weight of the additives, experiment has proved that the total proportion of the additives can be anywhere between about 0.01 and 5.00 parts by weight. Such experiment is not presented here because the results are self-evident from the foregoing Examples 63-162.

TABLE 8

| | Paste ingredients | | Capacitor properties | | |
|---|---|---|---|---|---|
| Examples | PbO—$B_2O_3$—$SiO_2$ glass frit, weight part | Additives (Each 0.1 weight part) | Capacitance, nF | Dielectric loss tangent, $\times 10^{10-2}$ | Tensile strength, kg |
| 163 | 0.01 | $Pb_3O_4$ & $Bi_2O_3$ | 59 | 0.96 | 1.2 |
| 164 | 0.01 | $Bi_2O_3$, $Pr_6O_{11}$ & CuO | 60 | 0.93 | 1.3 |
| 165 | 0.01 | $Bi_2O_3$, $Pr_6O_{11}$ & CuO | 61 | 0.89 | 1.3 |
| 166 | 0.01 | $Pb_3O_4$, $Bi_2O_3$, $Pr_6O_{11}$, CuO & CdO | 61 | 0.89 | 1.3 |
| 167 | 0.50 | $Bi_2O_3$ & $Pr_6O_{11}$ | 61 | 0.85 | 1.8 |
| 168 | 0.50 | $Pr_6O_{11}$, CuO & CdO | 62 | 0.80 | 1.8 |
| 169 | 5.00 | $Pb_3O_4$, $Pr_6O_{11}$, CuO & CdO | 63 | 0.74 | 1.8 |
| 170 | 5.00 | $Pb_3O_4$, $Bi_2O_3$, $Pr_6O_{11}$, CuO & CdO | 63 | 0.69 | 1.9 |
| 171 | 10.00 | $Pr_6O_{11}$ & CuO | 57 | 0.61 | 1.4 |
| 172 | 10.00 | $Pb_3O_4$, CuO & CdO | 58 | 1.29 | 1.2 |
| 173 | 10.00 | $Pb_3O_4$, $Bi_2O_3$, CuO & CdO | 59 | 1.10 | 1.2 |
| 174 | 10.00 | $Pb_3O_4$, $Bi_2O_3$, $Pr_6O_{11}$, CuO & CdO | 60 | 1.06 | 1.1 |

The foregoing Examples 63-174, concerning the zinc pastes containing additives in the form of metal oxides, all employ the PbO—$B_2O_3$—$SiO_2$ glass frit of the kind used in Examples 1-5, and do not deal with the glass frits of the other compositions, referenced B to H, listed previously. As has been experimentally confirmed, however, the use of these glass frits B to H in combination with the metal oxides cited as preferred examples of additives provides results similar to those of Examples 63-174. Such results would also be readily reasoned from Examples 6-62 taken together with Examples 63-174.

Figure 4:
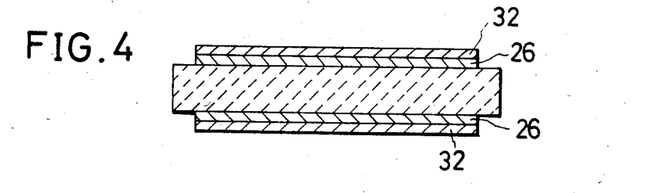
FIG. 4 is a diametrical section through another example of ceramic capacitor having conductors made from the zinc paste.

Admittedly, the conductors formed on ceramic bodies by use of the zinc paste of this invention are less solderable than the conventional silver conductors. The solderability of the zinc conductors is easy to improve, however, by covering the zinc conductors with layers of a less ionizable metal such as copper or nickel by electroless plating. FIG. 4 shows at 32 such platings of more solderable metal on the zinc conductors 26 of capacitors. Alternatively such solderable overlayers may be formed by the plating, vapor deposition, or coating of gold or silver. The use of the precious metals will not significantly add to the cost of the capacitors because the overlayers can be of minimal thickness.

EXAMPLES 175-178

These Examples deal with the applicability of the zinc pastes in accordance with the invention to the electrodes of ceramic varistors. The zinc pastes tested were identical in composition with those of Examples 1-5, 63-82, 103-122, and 143-162. First, for the preparation of varistors, there was formed a mixture of 99.6 mole % titanium dioxide, $TiO_2$, 0.2 mole % niobium oxide $Nb_2O_5$, and 0.2 mole % manganese dioxide, $MnO_2$, to which was added a solution of polyvinyl alcohol as an organic binder. The mixture was molded into discs, and these were baked in a reductive atmosphere. Each ceramic disc thus fabricated had a diameter of 8 mm and a thickness of 0.8 mm.

Then the zinc pastes of Examples 1-5, 63-82, 103-122 and 143-162 were coated on the ceramic discs, and the coatings were baked at 750° C. for ten minutes in a tunnel-shaped heater in exposure to atmosphere, thereby completing varistor electrodes on the ceramic discs. The coated ceramic discs were held in the heater for a total of 40 minutes including the time required for raising and lowering the temperature of the heater.

In order to ascertain the properties of the varistors thus prepared, there were measured the voltage $E_{10}$ of each varistor when a current of 10 milliamperes (mA) flows therethrough, and the voltage $E_1$ when a current of 1 mA flows therethrough. From these voltages $E_{10}$ and $E_1$ the nonlinearity coefficient $\alpha$ was computed by the equation, $\alpha = 1/\log(E_{10}/E_1)$. Also, in order to determine the strength with which the zinc electrodes of the varistors adhere to the ceramic discs, a copper wire of 60.0 mm in length and 0.6 mm in diameter was soldered perpendicularly to the center of one of the electrodes of each varistor, with use of approximately 50 mg of solder and by application of ultrasonic vibration. With the ceramic disc of each varistor held against movement, the wire was pulled via a spring scale until the electrode came off the disc. The reading in kg of the spring scale at that time was recorded as the tensile strength T. The results were as given in Table 9, wherein Examples 175 to 178 combinedly represent the values exhibited by the varistors using the zinc pastes of Examples 1-5, 63-82, 103-122 and 143-162, respectively.

TABLE 9

| Examples | Zinc pastes in use | Varistor properties | | |
|---|---|---|---|---|
| | | $E_{10}$, V | α | T, kg |
| 175 | Examples 1–5 | 9.7–10.4 | 3.0–3.3 | 1.1–1.9 |
| 176 | Examples 63–82 | 9.8–10.5 | 3.1–3.3 | 1.0–2.0 |
| 177 | Examples 103–122 | 9.8–10.4 | 3.0–3.3 | 1.0–2.0 |
| 178 | Examples 143–162 | 9.7–10.5 | 3.1–3.4 | 1.0–2.0 |

By way of comparison a silver paste of the composition set forth in connection with Examples 1–5 was coated on ceramic discs, which had themselves been fabricated as in Examples 175–178. The coatings were baked at a temperature less than the melting point of silver. Measured by the same methods as above, the voltage $E_{10}$ of the varistors averaged 10.5 V, their nonlinearity coefficient α3.3. and their tensile strength T 1.8 kg. A comparison of these figures with those of Table 9 will show that the varistors with the zinc electrodes in accordance with the invention have approximately the same properties as do the varistors with the conventional silver electrodes.

Figure 5:
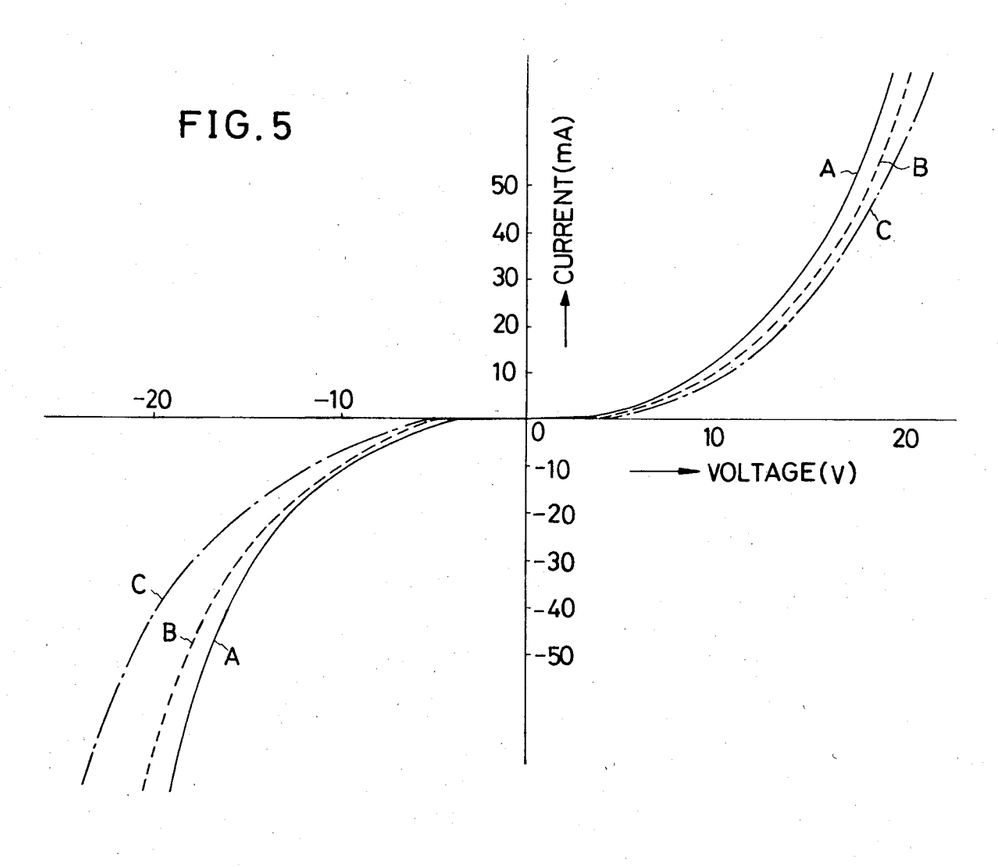
FIG. 5 is a graphic representation of the volt-ampere characteristics of some ceramic varistors having electrodes prepared in accordance with the principles of the invention and with the prior art.

For a study of the ohmic contact between the zinc electrodes and ceramic bodies of varistors, an electrode was formed on one face of each of several ceramic discs by use of the zinc paste of Example 3. An electrode of indiumgallium (In-Ga) alloy was formed on the other face of each ceramic disc. The curve A of FIG. 5 plots the mean volt-ampere characteristic of the thus fabricated varistors. Two other kinds of varistors were prepared by way of comparison, one having In-Ga electrodes on opposite faces of each ceramic disc and the other having a silver electrode and an In-Ga electrode on the opposite faces of each ceramic disc. The curves B and C of FIG. 5 represent the mean volt-ampere characteristics of the varistors with the In-Ga electrodes and of the varistors with the silver electrode and In-Ga electrode. As will be noted from comparison of the curves A and C, the zinc electrodes make better ohmic contact with the ceramic discs than do the silver electrodes.

Although the zinc paste of this invention is applied only to $SrTiO_3$ capacitors and $TiO_2$ varistors in the foregoing Examples, it also lends itself to use in $TiO_2$ ceramic capacitors, and $BaTiO_3$ ceramic capacitors, thermistors, and piezoelectric elements, as has been confirmed by experiment. It will of course be seen that the solderable overlayers 32 of FIG. 4 can be formed not only on the zinc conductors of capacitors but also on the zinc electrodes of varistors.

We claim:

1. A method of forming a conductive electrode on a ceramic substrate to form a capacitor, varistor, thermistor, or piezoelectric element, comprising the steps of:
    applying an electroconductive paste to said substrate, said paste comprising 100 parts by weight of zinc powder, from about 0.01 to 10.00 parts by weight of a glass frit, from about 0.01 to about 5.00 parts by weight of an additive selected from the class consisting of Pb, Bi, Pr, Cu, Cd and the compounds of these elements, and an organic vehicle for pasting the mixture of the zinc powder, the glass frit and the additive; and
    baking the paste on the ceramic substrate in order to drive off the organic vehicle and to cause the zinc powder particles to fuse to one another, whereby a conductor is formed.

2. The method of claim 1 wherein the compounds are oxides.

3. The method of claim 1 wherein the oxides include $Pb_3O_4$, $Bi_2O_3$, $Pr_6O_{11}$, CuO and CdO.

4. The method of claim 1 to form a capacitor or varistor.

5. The method of claim 2 to form a capacitor or varistor.

6. The method of claim 3 to form a capacitor or varistor.

* * * * *

UNITED STATES PATENT AND TRADEMARK OFFICE
CERTIFICATE OF CORRECTION

PATENT NO. : 4,567,059
DATED : January 28, 1986
INVENTOR(S) : Nobutatsu Yamaoka and Kazuo Sasazawa It is certified that error appears in the above-identified patent and that said Letters Patent is hereby corrected as shown below:

Table 3, Example 64; change "1.10" to read -- 0.10 --

Table 3, Example 67; change "1.10" to read -- 0.10 --

Column 8, line 12; change "$PbO-B_2O_{3-SiO2}$" to read $PbO-B_2O_3-SiO_2$

Signed and Sealed this

Thirteenth Day of May 1986

[SEAL]

Attest:

DONALD J. QUIGG

Attesting Officer

Commissioner of Patents and Trademarks